(12) United States Patent
Rim

(10) Patent No.: US 7,530,349 B2
(45) Date of Patent: May 12, 2009

(54) HYDRATED EGR SYSTEM, METHOD AND APPARATUS FOR REDUCING HARMFUL EXHAUST EMISSIONS AND IMPROVING FUEL ECONOMY

(76) Inventor: Julius J. Rim, c/o Intermet Ltd., 45429 Tournament Dr., Northville, MI (US) 48168

( * ) Notice: Subject to any disclaimer, the term of this patent is extended or adjusted under 35 U.S.C. 154(b) by 76 days.

(21) Appl. No.: 11/890,303

(22) Filed: Aug. 3, 2007

(65) Prior Publication Data

US 2009/0032000 A1    Feb. 5, 2009

(51) Int. Cl.
F02M 25/07 (2006.01)
F02B 47/08 (2006.01)
F01N 7/12 (2006.01)
F01N 3/04 (2006.01)

(52) U.S. Cl. .......... 123/568.15; 60/274; 60/278; 60/310

(58) Field of Classification Search ......... 123/1 R, 123/1 A, 568.11, 568.12, 568.15; 60/274, 60/278, 279, 282, 297, 310, 311, 324; 55/DIG. 30; 96/52, 88

See application file for complete search history.

(56) References Cited

U.S. PATENT DOCUMENTS

| | | | |
|---|---|---|---|
| 1,750,342 A | 3/1930 | Bailey | |
| 2,017,481 A * | 10/1935 | Von Opel | 123/568.15 |
| 2,956,559 A * | 10/1960 | Johnson | 60/279 |
| 3,340,859 A * | 9/1967 | Williamson | 60/279 |
| 3,552,364 A | 1/1971 | Short et al. | |
| 3,655,169 A | 4/1972 | Goldfarb | |
| 4,112,892 A * | 9/1978 | Lindberg | 123/568.15 |
| 4,132,247 A * | 1/1979 | Lindberg | 123/568.15 |
| 4,141,323 A | 2/1979 | Hart | |
| 4,166,435 A | 9/1979 | Kiang | |
| 4,306,520 A | 12/1981 | Slaton | |
| 4,311,118 A | 1/1982 | Slagle | |
| 4,337,731 A | 7/1982 | Lohberg | |
| 4,489,703 A * | 12/1984 | Falzone | 123/568.15 |
| 4,519,341 A | 5/1985 | McGarr | |
| 4,800,848 A | 1/1989 | Hubbard | |
| 4,900,480 A * | 2/1990 | Litz et al. | 261/36.1 |
| 5,084,078 A * | 1/1992 | Suzuki et al. | 60/279 |
| 5,199,386 A | 4/1993 | Hubbard | |
| 5,407,887 A | 4/1995 | Miyashita et al. | |
| 5,494,020 A * | 2/1996 | Meng | 123/568.15 |

(Continued)

FOREIGN PATENT DOCUMENTS

JP    2005308281 A  * 11/2005  .......... 60/274

Primary Examiner—Willis R Wolfe, Jr.
(74) Attorney, Agent, or Firm—Carrier, Blackman & Associates, P.C.; William D. Blackman; Joseph P. Carrier

(57) ABSTRACT

A hydrated EGR system, method and apparatus for a vehicle, in which heat from an exhaust pipe is used to heat an aqueous fluid solution in a water tank. A portion of the hot exhaust gas is diverted from the main exhaust flow, and the diverted portion is bubbled through the heated aqueous fluid solution to form a hydrated EGR mixture containing water vapor. The hydrated EGR mixture is then fed back to an intake portion of the engine, is mixed with an incoming fuel/air mixture, and is burned with the fuel air mixture inside the engine. The use of the hydrated EGR mixture, including heated water vapor, as part of the intake charge simultaneously reduces harmful exhaust emissions, improves engine performance, and improves fuel economy of the vehicle.

12 Claims, 5 Drawing Sheets

U.S. PATENT DOCUMENTS

| | | |
|---|---|---|
| 5,718,194 A | 2/1998 | Binion |
| 6,109,023 A * | 8/2000 | Mirochnitchenko et al. ... 60/278 |
| 6,227,181 B1 * | 5/2001 | Suzuki ................. 123/568.15 |
| 6,817,348 B2 | 11/2004 | Wettergard et al. |
| 6,892,531 B2 | 5/2005 | Rim |
| 7,051,720 B2 | 5/2006 | Gottemoller et al. |

* cited by examiner

HYDRATED EGR SYSTEM, METHOD AND APPARATUS FOR REDUCING HARMFUL EXHAUST EMISSIONS AND IMPROVING FUEL ECONOMY

BACKGROUND OF THE INVENTION

1. Field of the Invention

The present invention relates to an hydrated EGR system, method and exhaust treatment apparatus for use in a vehicle having an internal combustion engine, to simultaneously reduce harmful exhaust emissions, improve engine performance and increase fuel economy. More specifically, the present invention relate to a hydrated EGR system, method and exhaust treatment apparatus in which heat from an exhaust pipe heats an aqueous fluid solution in a tank, and a portion of hot exhaust gas is bubbled through the heated aqueous fluid solution to form a hydrated EGR mixture containing water vapor. The hydrated EGR mixture is then fed to an intake portion of the engine, using pressure from the exhaust system, and the hydrated EGR mixture is burned with the air/fuel mixture as part of the combustion charge.

2. Description of the Background Art

In efforts to reduce global-warming gas emissions, energy-efficient internal combustion engines may be advantageously used. Many of the known engines today recycle part of the exhaust gas back into the intake manifold via an exhaust gas recirculation (EGR) system. The introduction of some exhaust gas into the intake charge tends to reduce oxides of nitrogen (NOx) present in exhaust gas emitted from the vehicle's tailpipe.

Another method of reducing NOx emissions in internal combustion engines is to add water into the air/fuel mixture entering the combustion chamber, to reduce the peak flame temperature. Water additive methods known in the art include 1) water-injection, 2) water-fuel emulsion, and 3) water-fumigation.

Examples of patents relating to water injection methods include U.S. Pat. No. 4,519,341, U.S. Pat. No. 4,311,118, and U.S. Pat. No. 4,800,848. Other patents which suggest the use of water or water vapor as a component of the combustion charge include U.S. Pat. Nos. 3,552,364, 3,655,169, 4,306,520, 4,337,731, 5,718,194, 6,817,348, 6,892,531, and 7,051,720.

However, water-addition methods including the EGR process are not widely practiced in engine systems, partly because of concerns about possible engine wear problems caused by the potential break-down of the protective film of lubricating oil by contact with water in critical rubbing metal surfaces, such as the surfaces between piston rings and cylinder walls and valve bearings, etc.

It is therefore, desirable to develop a system for engines that further reduces emissions using a method of injecting heated water vapor into an engine.

Due to increasing fuel costs there is also a need to improve fuel efficiency. Further, there is also an ongoing need to increase engine power.

An improved engine system is therefore needed, which would more effectively reduce unwanted pollutants. In particular, an engine system is needed which is operable to reduce emissions of oxides of nitrogen (Nox), while simultaneously improving fuel efficiency and increasing engine power.

SUMMARY OF INVENTION

The present invention provides an emissions-reduction system for internal combustion engines that are equipped with EGR.

An illustrative embodiment of the invention relates to a hydrated EGR system, method and apparatus for a vehicle, in which heat from an exhaust pipe is used to heat an aqueous fluid solution in a water tank. A portion of the hot exhaust gas is diverted from the main exhaust flow, and the diverted portion is bubbled through the heated aqueous fluid solution to form a hydrated EGR mixture containing water vapor.

The hydrated EGR mixture is then fed back to an intake portion of the engine, is mixed with an incoming fuel/air mixture, and is burned with the fuel air mixture inside the engine. The use of the hydrated EGR mixture, including heated water vapor, as part of the intake charge simultaneously reduces harmful exhaust emissions, improves engine performance, and improves fuel economy of the vehicle.

The system according to the invention may incorporate a water tank that cooperates with the exhaust system to generate hydrated EGR, and then feeds such hydrated EGR into the intake manifold to be mixed with the air-fuel mixture entering the intake manifold, to improve fuel efficiency and increase engine power. The present invention also relates to a method of using such a water tank on a vehicle for treating exhaust from the vehicle's engine.

The emissions-reduction system according to the present invention also provides an optional method of supplying water vapor and a catalyst to a engine's intake manifold, via the EGR system, to reduce NOx formation from exhaust gases, without causing an engine wear problem, while improving fuel efficiency and increasing engine power.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
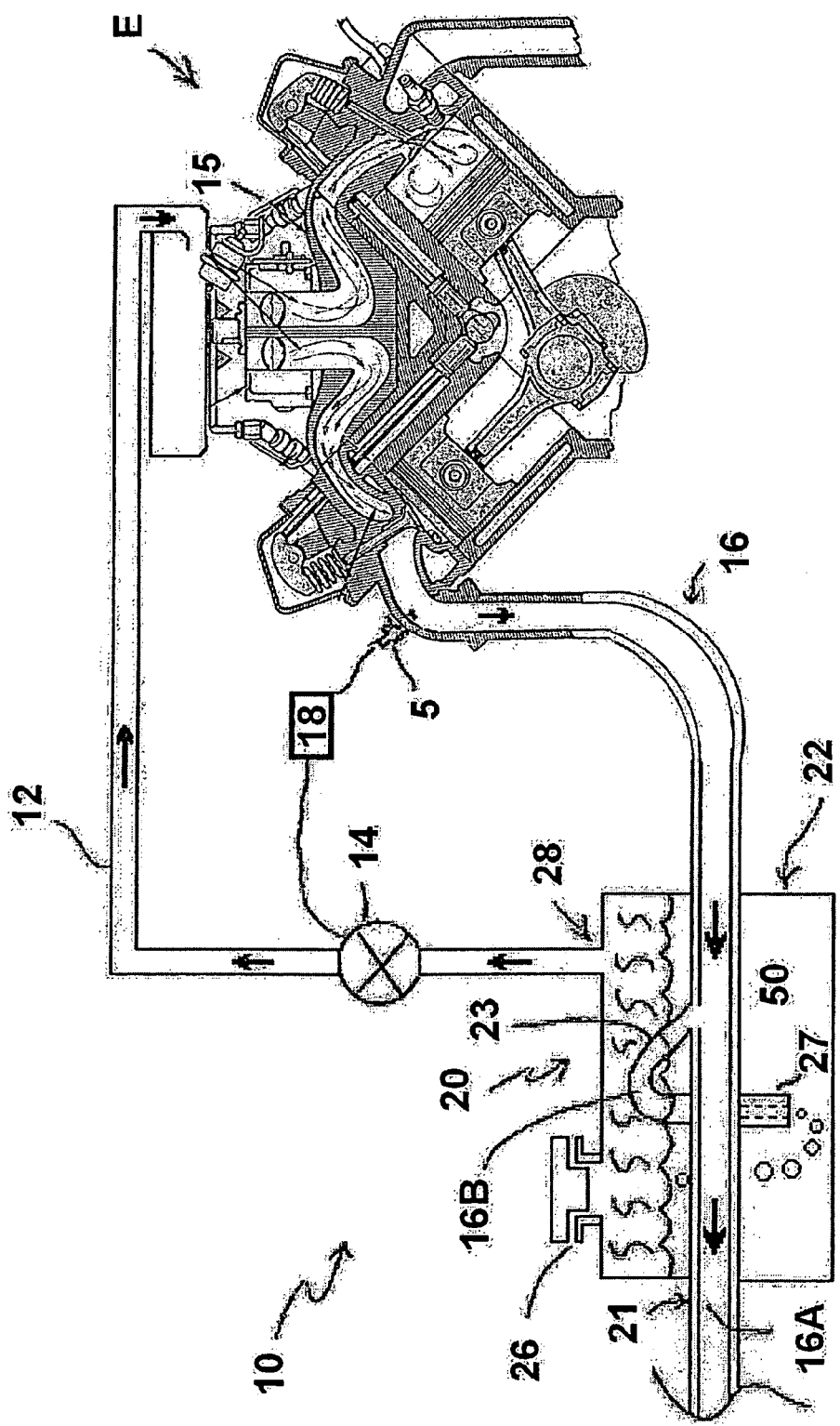
FIG. 1 is a simplified schematic depiction of an emissions-reducing hydrated EGR system according to an illustrative embodiment of the present invention, showing a path of exhaust gases bubbling through an aqueous solution in a water tank, and showing a path of hydrated EGR exhaust returning to the engine.

Referring now to FIG. 1 of the drawings, a hydrated EGR system according to an illustrative embodiment of the invention is shown generally at 10, for use with an internal combustion engine E. It will be understood that the emissions reducing system 10 according to the present invention is intended to be installed on a vehicle (not shown).

The emissions reducing system 10 according to the present invention is provided for use on an engine E, as shown schematically in the drawing. The core mechanical components of the engine E operate conventionally, using commercially available fuel in a fuel tank (not shown), which may be either diesel fuel or normal unleaded gasoline, depending on the type of engine used. As desired, the fuel may or may not be treated with a catalyst, and may be made up entirely of commercial fuel from a filling station. The engine E draws in air for combustion through its intake manifold 15.

The emissions reducing system 10 also includes an electronic control unit 18, which includes a microprocessor. Although many wires connecting the control unit 18 to other components of the system 10 have been omitted from the drawing, it will be understood that the control unit is connected to multiple sensors and control devices using wires. One example of a sensor that can be used with the system hereof is an exhaust pressure sensor S shown in FIG. 1. Those in the art will be familiar with such sensors and control devices, since they are widely used in the automotive industry today. Optionally, the control unit 18 may be made part of the main engine control module (ECM) or powertrain control module (PCM) of the vehicle.

As shown generally in FIG. 1, the system 10 includes an EGR conduit 12, a control valve 14 disposed in-line in the EGR conduit 12, and an EGR exhaust treatment apparatus 20. Hot exhaust gas is shown leaving the engine E and traveling through an exhaust pipe 16 until it reaches the EGR exhaust treatment apparatus 20, where the stream of exhaust gas is bifurcated into a main portion 16A and an EGR portion 16B. The main portion 16A of the exhaust gas passes through a metal exhaust transfer pipe 30 of the apparatus 20, which is at least partially immersed in an aqueous solution 50 disposed within a tank housing 22 of the exhaust treatment apparatus, in the depicted illustrative embodiment hereof. Optionally, the aqueous solution may contain one or more beneficial additives. Where used, the additives may contain one or more compounds selected from the group consisting of cerium carboxylate, copper naphthanate, copper acetate, and mixtures thereof.

The exhaust gas heats the metal exhaust transfer pipe 30, and this transfers heat from the exhaust into the aqueous solution 50, to raise the temperature thereof.

The EGR portion of the exhaust gas passes through a branch pipe 23 and exits outwardly from an open end thereof, and is then bubbled through the heated aqueous solution 50 in the tank housing 22 of the EGR exhaust treatment apparatus 20. The exhaust gas leaving the branch pipe 23 is mixed with water vapor boiled off of the solution, in an open area of the tank housing chamber 24 above the solution 50, to generate hydrated EGR. The hydrated EGR then leaves the tank 22 via an outlet port 28, and is transmitted through the EGR conduit 12 to be fed into an intake manifold 15 of the engine E.

Figure 2:
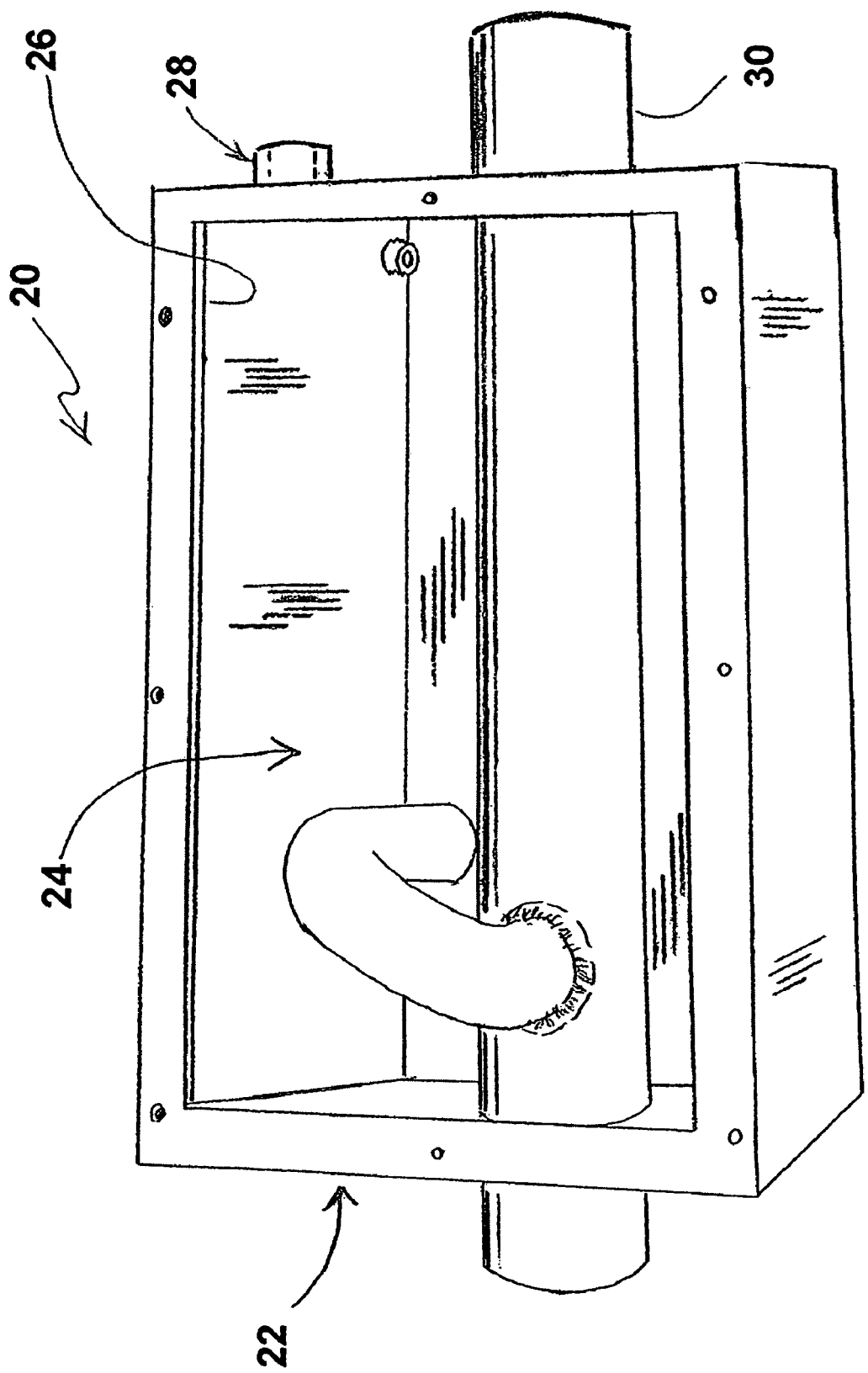
FIG. 2 is a medial cross-sectional view of a water tank, which is a component of the system of FIG. 1.
Figure 3:
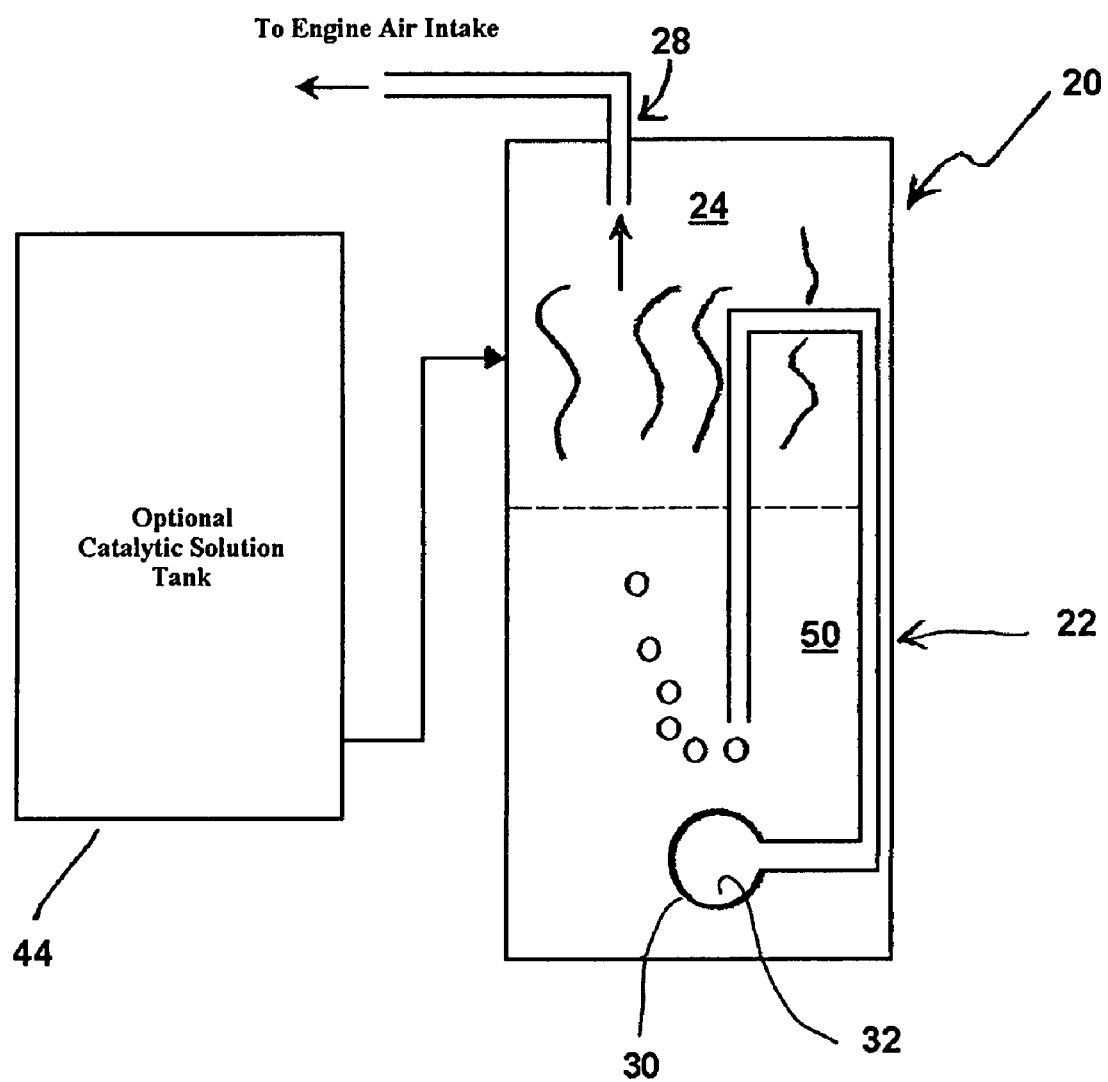
FIG. 3 is a detail perspective view of the water tank of FIG. 2, with a lid portion thereof removed for purposes of illustration.
Figure 4:
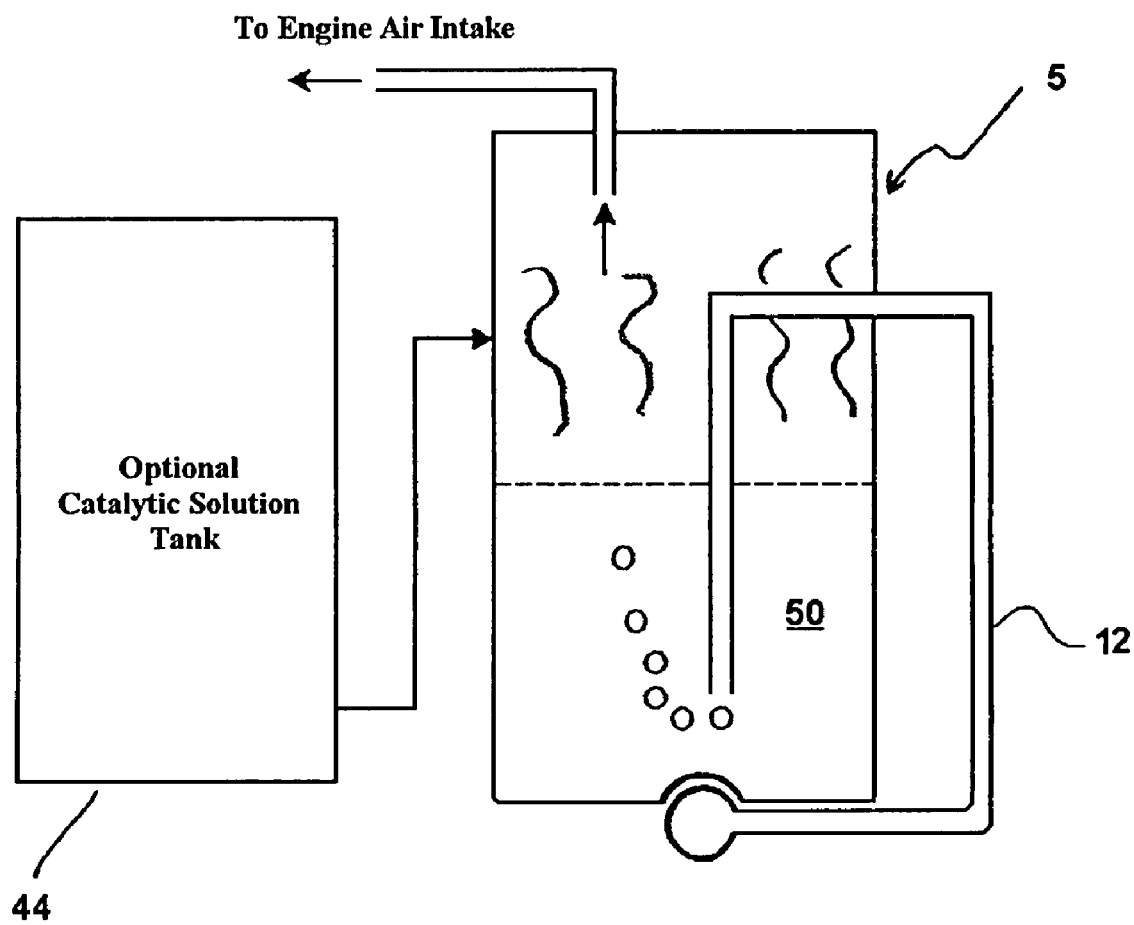
FIG. 4 is a medial cross-sectional view of a water tank according to an alternative embodiment of the present invention.

In FIGS. 2 and 3, a hydrated EGR exhaust treatment apparatus for a vehicle is shown generally at 20.

The apparatus 20 includes a main tank housing 22 having a hollow tank chamber 24 formed therein. The tank housing 22 is configured and adapted to hold a fluid solution 50 (FIG. 1) in the tank chamber 24, and is therefore sealed and made generally watertight.

The main tank housing 22 has an intake port 26 therein to permit addition of the fluid solution 50 into the tank chamber 24, and also has an outlet port 28 formed therein to allow passage of a flowable hydrated EGR mixture outwardly from the tank chamber.

A main exhaust transfer pipe 30 is connected to the main tank housing 22, and is provided for connecting to an exhaust system 16 of a vehicle. In this first embodiment, the main exhaust transfer pipe 30 passes through a central portion of the tank housing 22. The main exhaust transfer pipe 30 has a hollow passage formed therethrough, as shown, to permit the flow of exhaust gas therethrough.

An EGR branch pipe 23 branches off of the main exhaust transfer pipe 30 within the main tank housing 22. The EGR branch pipe 23 has a proximal end 25 attached to and in fluid communication with the main exhaust transfer pipe 30, and a distal end 27 opposite the proximal end and disposed in the tank chamber of the main tank housing. The distal end 27 of the EGR branch pipe 23 has an outlet which is open to the tank chamber 24, and adapted to be immersed in the fluid solution 50 during use.

The present invention also relates to a method of operating a vehicle having an internal combustion engine E therein.

Figure 5:
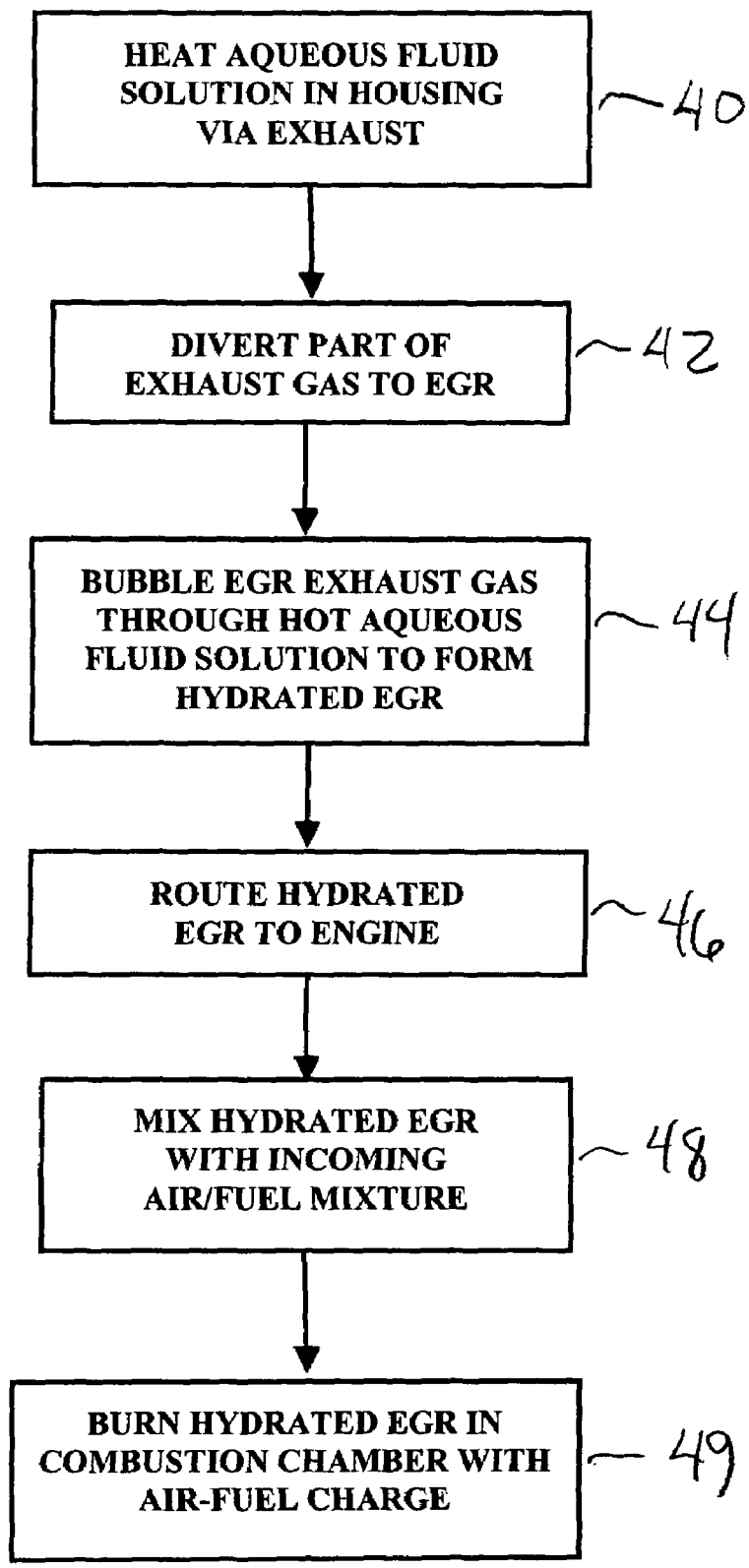
FIG. 5 is a diagram showing a sequence of steps in an illustrative method according to an illustrative embodiment of the invention.

The method includes a first step 40 (FIG. 5) of passing hot exhaust gas which has been output from the internal combustion engine E through an exhaust treatment apparatus 20, to heat a fluid solution in the apparatus. The exhaust treatment apparatus 20 is substantially the apparatus shown in FIGS. 1-3, including a tank housing 22 having a hollow tank chamber 24 formed therein and an exhaust pipe 30 which is connected to the tank housing, wherein the tank chamber has a aqueous fluid solution 50 therein, whereby heat from the exhaust pipe heats the aqueous fluid solution.

The method also includes steps of 42 passing a portion of the exhaust gas through an EGR branch pipe 23 which branches off of the exhaust pipe, and 44 bubbling the exhaust gas portion through the heated aqueous fluid solution 50 in the tank chamber 24 to form a hydrated EGR mixture containing water vapor.

The next step 46 in the method involves routing the hydrated EGR mixture outwardly from the exhaust treatment apparatus 20, to an intake portion 15 of the engine E through an EGR flow pipe 12.

The method further includes a step 48 of mixing the hydrated EGR mixture with intake air and vaporized fuel flowing into the intake portion 15 of the engine. Optionally, the method may include a step 49 of burning the mixture of hydrated EGR and the air-fuel mixture in a combustion chamber of the engine E.

Although the present invention has been described herein with respect to a specific illustrative embodiment, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

I claim:

1. An exhaust treatment apparatus for a vehicle, said apparatus comprising:

a main tank housing having a hollow tank chamber formed therein, said tank housing configured and adapted to hold a fluid solution in said tank chamber, said main tank housing having an intake port therein to permit addition of said fluid solution into said tank chamber and an outlet port formed therein to allow passage of an EGR mixture outwardly from said tank chamber;

an exhaust pipe which passes through the tank chamber of said main tank housing for connecting to an exhaust system of a vehicle, said exhaust pipe having a passage formed therethrough to permit the flow of exhaust gas through said exhaust pipe, and an EGR tube branching off of the primary exhaust pipe within the main tank housing, said EGR tube having a proximal end attached to and in fluid communication with the primary exhaust pipe, and a distal end opposite said first end and disposed in said tank chamber of said main tank housing, said distal end of said EGR tube being open to said tank chamber and adapted to be immersed in said fluid solution during use.

2. An exhaust treatment apparatus for a vehicle, said apparatus comprising:

a main tank housing having a hollow tank chamber formed therein, said tank housing configured and adapted to hold a fluid solution in said tank chamber, said main tank housing having an intake port therein to permit addition of said fluid solution into said tank chamber and an outlet port formed therein to allow passage of an EGR mixture outwardly from said tank chamber;

an exhaust pipe which is connected to said main tank housing for connecting to an exhaust system of a vehicle, said exhaust pipe having a passage formed therethrough to permit the flow of exhaust gas through said exhaust pipe; and an EGR pipe branching off of the primary exhaust pipe within the main tank housing, said EGR pipe having a proximal end attached to and in fluid communication with the primary exhaust pipe, and a distal end opposite said first end and disposed in said tank chamber of said main tank housing, said distal end of said EGR pipe having an outlet which is open to said tank chamber and adapted to be immersed in said fluid solution during use.

3. The exhaust treatment apparatus of claim 2, wherein said exhaust pipe extends through said tank housing, and is situated in the tank chamber so as to be at least partially immersed in said fluid solution during use.

4. The exhaust treatment apparatus of claim 2, further comprising a fluid level indicator attached to said tank housing.

5. The exhaust treatment apparatus of claim 2, wherein the exhaust pipe extends outwardly beyond the tank housing on two opposed sides of the tank housing.

6. The exhaust treatment apparatus of claim 2, wherein the exhaust pipe and the tank housing are integrally connected as a unitary body.

7. The exhaust treatment apparatus of claim 2, wherein the outlet of the EGR pipe is larger in diameter than the outlet port of the tank housing.

8. An exhaust emissions reduction system, comprising the exhaust treatment apparatus of claim 2 and an insulated EGR tube for placement on a vehicle between the tank housing outlet port and an engine.

9. A method of operating a vehicle having an internal combustion engine, said method comprising the steps of:

passing hot exhaust gas which has been output from said internal combustion engine through an exhaust treatment apparatus comprising a tank housing having a hollow tank chamber formed therein and an exhaust pipe which is connected to said tank housing, wherein said tank chamber has a aqueous fluid solution therein, whereby heat from said exhaust pipe heats said aqueous fluid solution;

passing a portion of said exhaust gas through an EGR outlet pipe which branches off of said exhaust pipe and bubbling said exhaust gas portion through said heated aqueous fluid solution in said tank chamber to form a hydrated EGR mixture containing water vapor;

routing said hydrated EGR mixture outwardly from said exhaust treatment apparatus and to an intake portion of said engine through an EGR flow pipe; and mixing said hydrated EGR mixture with intake air flowing into said intake portion of said engine.

10. The method of claim 9, further comprising a step of burning a fuel-air mixture containing said hydrated EGR mixture in a combustion chamber of said engine.

11. The method of claim 9, wherein the aqueous fluid solution comprises an additive composition.

12. The method of claim 11, wherein the additive composition comprises a material selected from the group consisting of cerium carboxylate, copper naphthanate, copper acetate, and mixtures thereof.

* * * * *